United States Patent
Ikenoya

(10) Patent No.: US 6,858,106 B1
(45) Date of Patent: Feb. 22, 2005

(54) PROCESS FOR PRODUCING PACKAGING LAMINATE

(75) Inventor: Tadakatsu Ikenoya, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/048,003

(22) PCT Filed: May 26, 2000

(86) PCT No.: PCT/JP00/03392

§ 371 (c)(1),
(2), (4) Date: May 31, 2002

(87) PCT Pub. No.: WO01/89829

PCT Pub. Date: Nov. 29, 2001

(51) Int. Cl.[7] .......................... B32B 15/08; B32B 31/04; B32B 31/12
(52) U.S. Cl. ....................... 156/184; 156/187; 156/191; 156/244.11; 156/324; 426/113
(58) Field of Search ................................. 156/184, 187, 156/191, 244.11, 324; 426/113; 206/524.1

(56) References Cited

U.S. PATENT DOCUMENTS 5,278,272 A    1/1994   Lai et al.

FOREIGN PATENT DOCUMENTS

| JP | 60-10768 U | 1/1985 |
|----|---|---|
| JP | 60-99647 A | 6/1985 |
| JP | 62-78-59 A | 4/1987 |
| JP | 4-31949 B2 | 5/1992 |
| JP | 5-28190 Y2 | 7/1993 |
| JP | 6-93120 A | 4/1994 |
| JP | 6-190960 A | 7/1994 |
| JP | 7-148895 A | 6/1995 |
| JP | 8-500068 A | 1/1996 |
| JP | 8-197692 A | 8/1996 |
| JP | 8-337237 A | 12/1996 |
| JP | 9-29868 A | 2/1997 |
| JP | 9-52299 A | 2/1997 |
| JP | 9-76375 A | 3/1997 |
| JP | 9-76435 A | 3/1997 |
| JP | 9-86537 A | 3/1997 |
| JP | 9-142455 A | 6/1997 |
| JP | 11-235780 A | 8/1999 |
| WO | WO 93/08221 A2 | 4/1993 |

OTHER PUBLICATIONS

Susumu Masaki, *Plastics*, vol. 44, No. 1, pp. 57–60.
*Chemistry Economy*, vol. 39, No. 9, pp. 44–48.
Yukio Sakota, *Plastics*, vol. 44, No. 10, pp. 83.

Primary Examiner—Sam Chuan Yao
(74) Attorney, Agent, or Firm—Burns, Doane, Swecker & Mathis, L.L.P.

(57) ABSTRACT

The invention provides a manufacturing method of a good laminate packaging which does not have the delamination between layers and a method of manufacturing of the laminate for packaging containing a barrier layer such as an aluminum foil and, fibrous carrier layer, etc. The deoxidant of vitamin E, ascorbic acid or its derivative is adhered/attached, to the inside of a barrier layer web, the barrier layer is temporarily rolled round by the reel shape, kept, and laminated by the extrusion lamination by the molten polyolefin.

20 Claims, No Drawings

PROCESS FOR PRODUCING PACKAGING LAMINATE

TECHNICAL FIELD

This invention relates to a method of manufacturing a laminate for packaging. In detail, this invention relates to the method of manufacturing of the laminate for manufacture of the container (or carton) for filling with/packaging hot liquid food sold with an automatic vending machine etc., and the packaging material laminate which has an oxygen (gas) barrier layer and contains the quality maintenance agent for food to be heated.

BACKGROUND ART

The packaging laminating material that has rich in plasticity has been used for packaging liquid food over many years.

The packaging container for cow's milk, juice, sake, white distilled liquor, mineral water, and other drinks is manufactured according to,
for example, forming the web shape creased packaging material of fibrous substrate (for example, paper etc.)/plastics laminate by longitudinal sealing to an elongated direction at the tube shape,
  filling a product to be filled in the packaging material formed by the tube shape,
  transversal sealing tube shape packaging material in the transversal direction,
  forming in the primary shape of a cushion or a pillow,
  cutting at fixed spacing at an individual container,
  folding up along with crease lines and forming in the final shape.

The final shape includes brick shapes with parallelepiped shapes, the shape of a polygon pillar, (the shape of a hexagon pillar, an octagonal pillar, etc.), tetrahedron shape with four triangular planes, etc. The material of a fibrous substrate is usually paperboard.

Furthermore, in the paper packaging container of a gable top shape (roof type), paper packaging material is cut in predetermined shape for the blanks sealed in the container lengthwise direction, after sealing the bottom of the blanks by the filling machine, cows milk, juice, or other drinks are packed from an top opening, the upper part is sealed, and the product container is obtained. In such packaging material, the appearance design of a packaging container product is printed on the surface.

The laminating packaging material used for the conventional paper packaging container product includes the following: A low density polyethylene (LDPE)/printing ink layer/paper substrate layer (fibrous carrier layer)/LDPE/aluminum foil (Al layer, gas barrier layer)/LDPE/LDPE, LDPE/printing ink layer/paper substrate layer/LDPE/LDPE, a printing ink layer/LOPE/paper substrate layer/LDPE/LDPE and LDPE/printing ink layer/paper substrate layer/LDPE/aluminum/polyester (PET). The above is also actually used widely currently.

In manufacture of the above-mentioned laminate for packaging, generally, the raw-paper roll of a paper substrate layer is carried to a press, the printed paper printed to the raw-paper side is again wound around a roll shape, subsequently to a raw-paper side, with an extrusion laminator, molten polyolefines (for example, LDPE etc.) are extruded from an extruder, and, if the gas barrier layers (aluminum foil etc.) other than a raw paper are included a gas barrier layer is also laminate-coated. When laminating the above gas barrier layers or adding the functional layer of further others, not all layers are laminated at once, partial laminate are prepared separately, respectively, for example, in-line, and these partial laminates are laminated further and the final laminate is obtained.

However, LDPE used is a high-pressure-process low density polyethylene. The low-molecular-weight component included in the high-pressure-process low density polyethylene bleeds to the face to be laminated of an opposite side in a temporary roll shape. Even if other layers are laminated to a surface to be laminated, a good adhesive property is not guaranteed. The low-molecular-weight component bleeds to the content of the liquid food in the paper container after container-izing and filling, and when preserving at a long period of time, the taste of liquid food deteriorates.

On the other hand, the laminate for paper containers which uses a linear low density polyethylene (LLDPE) for the innermost layer of the laminate for packaging is proposed (JP 62-78059A, JP 60-99647A, etc.). The LLDPE is very excellent in an impact strength, tear strength, cold brittleness, heat-sealing strength, hot tag performance, etc. However, how to solve the above-mentioned problem of the LDPE is not shown.

On the other hand, the paper container including in the innermost layer of the laminate for packaging the ethylene alpha olefins copolymer (the so-called metallocene PE, mLLDPE) which polymerized according to the metallocene catalyst is proposed. (JP,7-148895,A, JP,8-337237,A, JP,9-29868,A, JP,9-52299,A, JP,9-76435,A, JP,9142455,A, JP,9-86537,A, JP,9-76375,A, etc.). The metallocene PE is good for a low-temperature sealability, the workability of a film, and the health performance by a molecular weight distribution being narrow. As for the metallocene PE, the application to a container is known. (See WO 93/08221, Magazine "plastics" Vol. 44 No. 1 P 60, Magazine "chemistry economy" Vol. 39 No. 9 P 48, Magazine "plastics" Vol. 44 No. 10 P 83.) However, even though Metallocene PE has the low concentration of a low-molecular-weight component. In all the various process conditions in the production process of the actual laminate for packaging, the bond strength between the constitution layers of the laminate for packaging cannot be improved to practical strength.

When liquid food is fruit juice of citrus fruits etc., the non-scalping for perfume and tasty and an oxygen barrier are needed. In the liquid food, oxygen penetrates through the wall of carton and, for the reason, those nutritional value is lost. In order to reduce penetration of the oxygen to carton and to minimize degradation of nutrients, such as vitamin C, usually the layer of an aluminum foil is added to lamination material (laminate).

Although the aluminum foil is effective as a barrier material, the various attempts of development of a practical alternative to an aluminum foil are made due to the concern on the environment by the use. The alternative is provided with the outstanding barrier properties over oxygen, gas, and aroma, and can be easily scrapped after use.

Using the vapor deposition layer of an inorganic oxide for the packaging material for paper containers as an alternative which changes to an aluminum foil is proposed conventionally. (See JP,5-28190,Y, JP,8-500068,A, JP,6-93120,A). By the packaging material which has such a gas (oxygen) barrier, the paper container which has a non-scalping or a quality preservability can be offered. However, the junction performance of the vapor deposition layer surface of an inorganic oxide, and the adhesives for a lamination or a resin is not good. In all the various process conditions in the production process of the actual laminate for packaging, the adhesive strength between the constitution layers of the laminate for packaging is not practical.

In addition, in order to prevent oxidation degradation of a content food and increase of a microorganism by the oxygen which exists in the packaging, or in the oxygen which permeates from the outside, means to remove the oxygen inside the packaging are provided conventionally. For example, the technique of scavenging oxygen to packaging material using the synthetic resin which kneaded L ascorbic acid and the ferrous ion compound (JP,4-31949,Y) is known. Also known is packaging material which prevents the heat deterioration of the oxygen scavenger at the time of manufacture and the bleed out of oxygen scavenger, by having the adhesives layer which mixed ascorbic acid (derivative) and the transition-metal compound of a reaction accelerator (JP,6-190960,A), and packaging material which prevents the heat damage of the oxygen scavenger at the time of manufacture, and the bleed out of oxygen scavenger by spraying and adhering of the deoxidant and/or a desiccant to the adhesives layer on a substrate sheet, and coating of a protection layer (JP,60-10708,U).

However, in conventional packaging material aiming at quality retention of a contents product, the suitable packaging material for quality retention is not proposed to the liquid food kept and sold under warming, for example, a coffee drink, oolong tea, etc. With the above-mentioned conventional technique, various material is listed as oxygen scavenger. For several weeks or several months, under the condition of warming, when kept and sold within an automatic vending machine or a hot chamber, suitable packaging material (especially packaging material made of paper (fibrous)) is not suggested conventionally. The method of manufacturing of the good laminate for packaging without the delamination between layers is not indicated.

In this invention, the purpose aims at offering the manufacturing method of the good laminate for packaging without the delamination between layers based on an above-mentioned background. The purpose is offering the packaging laminating material which has strong layer adhesion in an automatic vending machine or a hot chamber under the condition of warming for the purpose of quality retention of the liquid food kept and sold, for example, a coffee drink, oolong tea, etc. for several weeks to several months. The purpose is offering the method of manufacturing of the laminate for packaging which converts efficiently, effectively and easily in manufacture of laminating package material.

DISCLOSURE OF INVENTION

The above-mentioned subject is solved by the method of manufacturing of the laminating packaging material according to this invention. The method of manufacturing of the laminate is characterized by manufacturing at least the laminate for packaging of the web shape which comprises of an innermost polyolefin layer, a barrier layer, such as an aluminum foil and an inorganic-oxide vapor deposition film, a polyolefin lamination layer, and a fibrous carrier layer according to the following step:

(a) a step of adhering/attaching a deoxidant (vitamin E or ascorbic acid, and its derivative) at the inside of the barrier layer having a web shape, (b) a step of rolling round the deoxidant-adhered/attached-barrier-layer temporarily to a reel shape, contacting the deoxidant-adhered/attached-inner surface of the barrier layer, and the barrier layer external surface directly, and keeping them predetermined time, (c) a step of pulling out the deoxidant-adhered/attached-barrier-layer from the kept reel, and laminating the barrier layer and the fibrous carrier layer by the extrusion lamination by the polyolefin of the resin for molten laminations between the external surface of the barrier layer, and the inside of the fibrous carrier layer and, (d) a step of laminating an innermost polyolefin layer by the extrusion lamination with the molten polyolefin to the inside of the deoxidant-adhered/attached-barrier-layer simultaneously, before and after the step (c).

In the preferable embodiment of the method of manufacturing of the laminate for packaging of this invention, adhering/attaching of the deoxidants (vitamin E or ascorbic acid, its derivative, etc.) to the inside of the barrier layer are coating to the barrier layer inside of the coating material in which the deoxidant is blended.

In the preferable embodiment of the method of manufacturing of the laminate of this invention, the innermost polyolefin contains at least the linear low density polyethylene which has a narrow molecular weight distribution, and has the properties parameter of the average density of 0.900–0.915, the peak melting point of 88–103-degree C., the melt flow index of 5–20, the swelling ratio (SR) of 1.4–1.6, and the layer thickness of 20–50-micrometer.

In the preferable embodiment of the method of manufacturing of the laminate of this invention, the above-mentioned laminate contains the quality maintenance agent for food to be heated.

In the preferable embodiment of the method of manufacturing of the laminate of this invention, the minute phyllosilicate currently dispersed uniformly substantially and the quality maintenance agent for food to be heated are contained in the laminate.

In the preferable embodiment of the method of manufacturing of the laminate of this invention, the reel shape laminate is kept in the ordinary temperature of 15 degrees C. –40 degrees C. for at least 48 hours for aging.

BEST MODE FOR WORKING INVENTION

In this invention, the laminate for packaging is the web shape laminate which comprises of, at least, the innermost polyolefin layer, the barrier layer such as an aluminum foil and an inorganic-oxide vapor deposition film, the polyolefin lamination layer, and the fibrous carrier layer.

In this invention, the above-mentioned innermost polyolefin layer is the single film of a polyolefin, or multi-layer containing, at least, the polyolefin layer. The polyolefin includes polyethylene (low density polyethylene, middle-density polyethylene, high-density polyethylene, and linear low density polyethylene, the so-called metallocene PE, etc.), polypropylene (homo polypropylene, ethylene propylene copolymer, etc.), poly-butene-1, and poly hexene-1. The polyolefin is polyethylene preferably. Is low-density polyethylene and metallocene PE further preferably, and is the metallocene PE in the most preferable embodiment to this invention.

Usually, the fibrous carrier layer (paper substrate) which can be used in this invention is the material made from kraft pulp, and needs the outstanding intensity and the low water-absorptivity. As the kind, there are a bleached paper (FBL), paper (UBL) which is not bleached, paper (DUPLEX) of FBL and UBL, clay coat paper, a multi-layer duplex paper (MB), etc., and anything may be used in this invention.

The polyolefin lamination layer used in order to laminate the laminated package material of this invention is chosen from low density polyethylene, LLDPE which contains at least the linear low density polyethylene which has a narrow molecular weight distribution, and has the specific properties parameter, an ethylene vinyl acetate copolymer (EVA), and an ionomer. The LLDPE works as an adhesive thermoplastic material layer between a paper substrate (fibrous carrier) layer and a barrier layer. The LLDPE contains at least the linear low density polyethylene which has a narrow molecular weight distribution, and has the properties parameter of the average density of 0.890–0.925, a peak melting point of 88–103-degree C., the melt flow index of 10–20, the swelling ratio (SR) of 1.4–1.6, and a layer thickness of 10–25 micrometer.

By use of the LLDPE, since the extrusion laminating properties and its converting properties in the case of package material manufacture are excellent, manufacture of package material laminating can carry out very good. Specifically, barrier layers, such as an aluminum foil, an inorganic-oxide vapor deposition film, etc. in this invention, have the oxygen permeability not more than 5 cc/m$^2$ 24 hr atm (23-degree-C. 50% RH). The aluminum foil in this invention is a gas barrier layer, for example, is aluminum foil with the thickness of 5–10 microns.

When using the thin layer of silicon oxides, such as a metallic oxide, in the preferable embodiment of this invention as a barrier layer, or when using the silicon oxide layer formed by the PECVD method as a barrier layer, elongation remarkable by breakage can be resisted. When incorporating a silicon oxide layer in lamination material and packaging liquid food, it is an especially important properties. Typically, the above-mentioned laminating packaging material is provided with the folding line (crease line) formed in the surface of a lamination in order to make easy bending and the clinch for package formation. The packaging material shows the outstanding durability over the thermodynamic stress which encounters under manufacture of a container, and in a distribution process. Since neither a crack nor a pinhole occurs, leakage by these folding line is not generated according to the capacity of the silicon oxide layer which can deform without fracturing. Especially the packaging material by this embodiment is useful to filling/packaging of liquid food.

Gas barrier layers other than the above-mentioned material can be included separately if needed.

In order to improve an adhesive property with a gas barrier layer and other laminating composition layers, a layer can also be laminated as an adhesive layer by use of the synthetic resin of an ethylene vinyl acetate copolymer (EVA) and the ionomer (IO) which cross linked between ethylene vinyl-methacrylate copolymer molecular by the metal ion. The suitable thickness of the adhesives layer is 10–50 micro approximately. Preferably, the adhesives layer is EVA or IO with a layer thickness of 10 micro-18 micro.

The laminating material for packaging for paper containers by this invention can include at least the ink layer by printing provided in the outside surface of the semi material which does not laminate the outermost resin layer yet, or the ink layer formed in the outside surface of the sealable outside resin layer. Ink includes the aqueous or oily ink for flexo printings, the oily ink for gravure, the hardenable ink for offset printing, etc. In the embodiment of the preferable package material for paper containers of this invention, the ink layer includes partial common components (for example, imine component etc.) with the component included in the anchor coat agent layer adhered with this ink layer.

In this invention, the thermoplastic material which laminates on the package material outside surface includes polyolefin resin, such as polyethylene, polypropylene, and an ethylene copolymer. The thermoplastic material includes the low density polyethylene (LDPE) used conventionally, linear low density polyethylene (LLDPE) excellent in the resistance (oil resistance, acid resistance, penetration resistance, etc.) against a content, middle-density polyethylene, the coextrusion film containing polyethylene, etc.

The method of manufacturing of the laminate is characterized by manufacturing the laminate for packaging of the web shape which comprises of at least the innermost polyolefin layer, the barrier layer, such as an aluminum foil and the inorganic-oxide vapor deposition film, the polyolefin lamination layer, and the fibrous carrier layer according to the following steps:

(a) the step of adhering/attaching a deoxidant (vitamin E or ascorbic acid, and its derivative) at the inside of the barrier layer of the web shape, (b) the step of rolling round the deoxidant-adhered/attached-barrier-layer temporarily to a reel shape, contacting the deoxidant-adhered/attached-inner surface of the barrier layer and the barrier layer external surface directly, and keeping them predetermined time, (c) the step of pulling out the deoxidant-adhered/attached-barrier-layer from the kept reel, and laminating the barrier layer and the fibrous carrier layer by the extrusion lamination by the polyolefin of the resin for molten laminations between the external surface of the barrier layer, and the inside of the fibrous carrier layer and, (d) the step of laminating the innermost polyolefin layer by the extrusion lamination with the molten polyolefin to the inside of the deoxidant-adhered/attached-barrier-layer simultaneously, before and after the step (c).

At the step (a) in the method of manufacturing of this invention, the deoxidant, preferably, vitamin E or ascorbic acid, and its derivative (for example, l-, d-, ld-ascorbic acid, ascorbate are adhered/attached at the inside of the barrier layer of web shape.

The method and embodiment which are adhered/attached are as follows optionally: for example, the method of spraying a deoxidant solution on the inside of a barrier layer, and removing a solvent, the adhesion/attachment method of forming the tacky adhesion film in the inside of a barrier layer thinly, and sprinkling powder, a granule shape, or a granular deoxidant and, the adhesion/attachment method of blending powder, a granule shape, or a granular deoxidant to a coating material, and covering the coating material to the inside of a barrier layer etc. The coating method includes the following method: for example, the method of spraying a liquefied coating-material resin on a barrier layer inside, a method of applying, doctor blade method, wet lamination-process, dry lamination-process, and extrusion lamination process, the T die coextrusion forming method, a coextrusion lamination process, a film blowing, etc.

The layer thickness of the deoxidant can be suitably changed by the purpose of a laminate etc. The layer thickness of the deoxidant is for example, 0.1–1.5 g/m$^2$, that is, 1–20 micro, preferably 2–15 micro. When including the deoxidant in a coating material, the content of a deoxidant is 10–30% more preferably 1 to 50%. As for selection of the coating material. It is desirable to change suitably by the purpose, the barrier layer, the material of the deoxidant, etc. In case the barrier layer is kept to a reel shape, due to contact the barrier layer external surface, the material which does not pollute the barrier layer surface and also does not block is chosen. For example, when using an aluminum foil as a barrier layer, the coating material of polyolefines and the coating material of titanates are preferable, and the coating material of polyolefines is preferable in the barrier layer in which the polyester film vapor depositted the silicon oxide.

At the step (b) of the method of manufacturing of this invention, the deoxidant-adhered/attached-inner surface of the barrier layer and the barrier layer external surface are contacted directly, and the reel is kept predetermined time by temporarily rolling up of the deoxidant-adhered/attached-barrier-layer into the reel shape.

As a result of the barrier layer's being rolled round by the reel shape, a storage space can be saved and the increase in efficiency of processing and work at a next step can be attained. On the other hand, the surfaces, such as the aluminum foil, contact the surface of another side directly, and the pollutants (for example, a low-molecular-weight component, a remains catalyst, etc.) of the surface of another side bleed. Moreover, there is a risk that the oxygen which exists in the gap between the surfaces may degrade the surfaces of such as the aluminum foil. In this invention, the deoxidant (vitamin E or ascorbic acid, and its derivative) exists in the gap between the surfaces, and prevents the surface contamination by the pollutant, or residual oxygen is caught and degradation/contamination of the barrier layer surface are prevented.

In the preferable embodiment, the reel shape barrier layer is kept by aging of at least 48–72 hours in the ordinary temperature of 15 degrees C. –40 degrees C. In this embodiment, the migration speed of the pollutant to barrier layer surfaces, such as the aluminum foil, can be controlled by storage in ordinary temperature, and contact and contamination can be minimized by the short time. In this invention, although the above-mentioned conditions are conditions in ordinary temperature and a short period, an elevated temperature, and long-term aging and storage are also more possible. In the production process by this invention, step conditions can be changed broadly.

In the step (c) in the method of manufacturing of this invention, the deoxidant-adhered/attached-barrier-layer is pulled out from the kept reel, between the external surface of this barrier layer and the inside of a fibrous carrier layer, by the extrusion lamination by the polyolefin, the resin for molten laminations is extruded and the barrier layer and the fibrous carrier layer are laminated.

Before, after or simultaneously the extruding lamination step, adhesives or an anchor-coat agent etc. can be laminated into each laminating material if needed by the dry lamination to the surface of laminate material etc.

The adhesives that constitute the adhesives layer in that case when using the dry-laminate method includes specifically, two liquid cure type urethane adhesives used in a dry laminate etc., polyester urethane adhesives, polyester urethane adhesives, acrylic adhesives, polyester adhesives, polyamide adhesives, polyvinyl acetate adhesives, epoxy adhesives, rubber adhesives, etc. The laminating of each laminating material can be reinforced using the above-mentioned adhesives for dry laminations.

Moreover, when using an anchor-coat agent, anchor-coat agents, such as isocyanate (urethane), polyethylene imine, poly-butadiene, and organic titanium, or anchor-coat agents, such as adhesives for a lamination, such as polyurethane, poly-acrylic, polyester, epoxy, polyvinyl acetate, and cellulose, can be used. The laminating of each laminating material can be reinforced by them.

In this invention, on the further laminating, a corona treatment can be carried out to the surface of laminating material, such as the aluminum foil, and additional processing of ozonization etc. can be carried out if needed.

The resin for laminations which can be used in this invention includes for example, polyethylene (for example, metallocene PE is included), ethylene alpha-olefin copolymer, polypropylene, polybutene, poly-isobutene, poly-isobutylene, polybutadiene, polyisoprene, an ethylene methacrylic-acid copolymer, copolymers of ethylene and unsaturated carboxylic acid, such as ethylene acrylic acid copolymer, acid-modified polyolefin resin that modified the above, ethylene ethyl acrylate copolymer, ionomer resin, ethylene vinyl acetate copolymer, etc.

In this step, laminating constitution layers, such as an ink layer, a metal vapor deposition layer, a metal vapor deposition support film, and an outermost thermoplastic material layer, may also be included in the fibrous carrier layer in addition to the carrier layer.

In the preferable embodiment of the method of manufacturing of the laminate of this invention, the food-to-be-heated quality maintenance agent can be contained in a laminate. For example, the adhesives for dry laminations or an anchor-coat agent contains the quality maintenance agent for food to be heated. As the quality maintenance agent for food to be heated, ascorbic acid, ascorbate (vitamin C is included), vitamin E, etc. are included.

In this embodiment, the layer of the adhesives containing the quality maintenance agent for food to be heated exists in the laminate, and when for example, a food-to-be-heated quality maintenance agent is water-soluble, as for these adhesives, it is preferable to use the adhesives which can be diluted with a water solvent. Specifically, the adhesives for dry laminates (for example, adhesives of polyester, polyurethane, poly-imine, and polyester polyurethane), and for example, an anchor-coat agent (for example, anchor-coat agent of urethane, polyurethane, poly-imine, and polyester polyurethane) and anchor-coat agents for dry laminates, such as silicone, quick cured type urethane, and epoxy amine, can be used.

In the adhesives (including the anchor-coat agent), the food-to-be-heated quality maintenance agent which absorbs the air dissolved into liquid food and which blocked the air and the quality inhibitor which penetrated the gas barrier layer during heating is contained. However, the following is not preferable to a food-to-be-heated quality maintenance agent in this invention, the following is not included: oxygen scavenger of iron or enzymes, the chelate compound which has a porphyrin ring and oxygen scavenger which comprises of an organic compound and a reaction accelerator (oxygen scavenger which comprises of a transition-metal compound as the reaction accelerator, including ascorbic acid, its derivative or fatty acid as the organic compound), oxygen scavenger which comprises of ascorbic acid of a reducing agent as the reaction accelerator, including the transition metal complex of polycarboxylic acid or salicylic acid chelate as the organic compound. In the preferable embodiment of this invention, ascorbic acid, ascorbate, the derivative (including vitamin C) and/or vitamin E are preferable.

As long as the food-to-be-heated quality maintenance agent is fully dispersed, any method of including the food-to-be-heated quality maintenance agent in the above-mentioned adhesives can use optionally, the method of absorbing the food-to-be-heated quality maintenance agent solution-ized to resin powder or other supports, the method of carrying out the microencapsulation of the food-to-be-heated quality maintenance agent using gas penetration material, and carrying out kneading/dispersing to adhesives or its solution, the method of including main agent and curing agent, after mixing to the food-to-be-heated quality maintenance agent of the main agent and/or the curing agent, when adhesives are the adhesives of two liquid. After containing a main agent and a curing agent, the method of a food-to-be-heated quality maintenance agent being included is preferable. By this method, it is because adhesion ability of adhesives is not spoiled.

Although the content to the adhesives (anchor-coat agent) of the food-to-be-heated quality maintenance agent changes with aimed absorbing power, it is preferable to consider as 1–50 wt. % of food-to-be-heated quality maintenance agents to adhesives, more preferably 5–20 wt. %. When less than the above-mentioned range, gas-absorption ability becomes remarkably low, and when more than the above-mentioned range, the trouble may happen in the adhesion ability of adhesives.

As for the mixture and mixing to the anchor-coat agent of the food-to-be-heated quality maintenance agent, it is preferable to avoid the elevated temperature more than 40 degrees C., and it is preferable to carry out under temperature conditions, ordinary temperature, for example, 10 to 30 degrees C., preferably, for example, 15 degrees C. to 35 degrees C.

In the preferable embodiment in this invention, the minute phyllosilicate currently substantially dispersed uniformly, for example. In the adhesives layer in the laminate is contained. In packaging material, the phyllosilicate which has 1–80 microns of it average particle diameters, and does not include the grain size of 300 microns or more in an adhesives layer preferably is contained 0.1 to 10 wt. %. The phyllosilicate is substantially dispersed uniformly in 50 Å or more of distance between layers.

In this embodiment, the shape of a minute layer of the silicate means one unit of the substance with one side of 0.002–1 micrometer, and the thickness of 6–20 A. The distance between layers of the phyllosilicate means the distance between the center of gravity of the plate of phyllosilicate. The uniform dispersion of phyllosilicate means the state where 50% or more of the silicate separates into every sheet without lump formation, keeps the distance between layers 100 A or more in parallel and/or random mutually, and disperses on the molecular level in the case of dispersion of phyllosilicate. The 70% or more of phyllosilicate is in the above-mentioned state still more preferably.

In the raw material of such sheet silicate, the phyllosilicate mineral (phyllosilicate) which consists of layers of a magnesium silicate or aluminum silicate can be shown. In the preferable embodiment of this invention, the phyllosilicate (clay mineral) which has between layers a metal ion (except for Na, K, Li, and calcium) (for example, metal ion chosen from Ag, Zn, Co, Cd, and Cu) or its metal compound can be used. The phyllosilicate itself has good antibacterial ability to various microorganisms, such as a *pseudomonas aeruginosa, coliform bacillus*, and a *Staphylococcus aureus*. Therefore, the antibacterial ability is given to the packaging laminated material containing the phyllosilicate.

In the method of manufacturing of the antibacterial phyllosilicate, the antibacterial phyllosilicate containing a metal ion can be obtained by separation, washing, and drying of a precipitate which are obtained according to dispersion of the water swelling clay mineral to the solution of organic solvents, such as methanol and acetone, and water with the water-soluble salt of the metal chosen from Ag, Zn, Co, Cd, and Cu.

In the preferable embodiment of the method of manufacturing of the laminate of this invention, the polyolefin of the innermost film has the following properties parameter. The, polyolefin contains the linear low density polyethylene which has a narrow molecular weight distribution, and has the properties parameter of the average density of 0.900–0.915 (preferably 0.905–0.910), peak melting point of 88–103-degrees C. (preferably 93–103 degrees C.), the melt flow index of 5–20, the swelling ratio (Swelling Ratio, SR) of 1.4–1.6, and layer thickness of 20–50 micrometers (preferably 20–30 micrometers).

Such linear low density polyethylene is blend polymer which contains at least the linear low density polyethylene (mLLDPE) which has the narrow molecular weight distribution obtained by the polymerization which used for example, the metallocene catalyst. The ethylene-α-olefin copolymer obtained as this mLLDPE by the polymerization which the metallocene catalyst used can be used.

In this invention, as long as the above-mentioned properties parameter is kept, resins other than above-mentioned mLLDPE can be used. In cases where it is difficult to obtain the above-mentioned properties parameter by mLLDPE sole, other polymer components can be blended. The above-mentioned other polymer is thermoplastic resins, such as polyolefin resin, such as polyethylene, polypropylene, and an ethylene copolymer, and a polyester resin. The polymer includes conventional low-density polyethylene (LDPE) and linear low density polyethylene (LLDPE) excellent in the resistance (oil resistance, acid resistance, penetration resistance, etc.) over a content, the co-extrusion polymer of middle-density polyethylene and polyethylene, etc.

EXAMPLE

Example 1

The thin coating of a vitamin-E solution was formed in one side of the aluminum foil of a web shape with a thickness of 9 micro, and the solvent was removed immediately. The layer (an average of 0.7 micro of layer thickness) of vitamin E (Ve) was formed. The aluminum foil roiled round to the reel shape succeedingly. The one side surface of the aluminum foil contacted the surface of another side. In the condition, by 25 degrees C., the laminate of the reel shape was aged for four days, and was kept. Subsequently, the laminate was un-wound from the reel currently kept.

In the laminator, the low-density polyethylene (LDPE) which melted was extruded from the heated T die to the aluminum foil (Al) surface of the laminate of a web shape. The non-printed rear face of the raw paper from the roll of the printed raw paper (paper) and the aluminum foil surface were laminated by the extrusion lamination. In this laminator, the low-density polyethylene which melted also to the raw-paper printing surface was extruded simultaneously, and the waterproofing outermost thermoplastic resin layer (the outermost LDPE) was formed. By the extrusion of the molten low-density polyethylene to the inside of the aluminum foil, the innermost thermoplastic resin layer (innermost LDPE) was formed. The laminations of the obtained packaging laminating material are outermost LDPE/paper/LDPE/aluminum/Ve/innermost LDPE.

About the obtained packaging laminating material, the adhesive strength of the face of the aluminum foil, and the innermost polyethylene layer and the raw-paper layer was respectively measured by the JIS K6854 method (50 mm/min: Tensile speed). The adhesive strength of the result shows sufficient adhesive strength practically. It is almost equivalent to the adhesive strength at the time of manufacturing packaging laminating material by corona processing of the aluminum foil before the lamination.

A brick shape container was obtained by formation of the crease line to the packaging laminated material obtained in the example, tube shape forming filling of the liquid food into tube-like package material by the longitudinal seal of the package material, the transversal seal to the transversal direction of tube-like package material, forming to cushion form primary shape, cutting by the fixed interval, and forming to the final shape by folding in alignment with the crease line.

In cases where liquid food is green tea, the increase in the oxygen concentration of the liquid after preservation for three weeks and two months under the conditions of 60–75 degrees C. and 60% RH is not observed. Moreover, there is no generating of foreign matters, such as mold, and the deterioration of a flavor, flavor, and a scent and other something unusual are not seen. Similarly, in cases where liquid food is a coffee drink, the result of the same evaluation is good.

Example 2

Except using vitamin C (l-ascorbic acid) instead of vitamin E, and forming an average of 0.4 micro of layer thickness of vitamin C, the laminating material for packaging by this invention was obtained and evaluated like an example 1, and the same result as the above was obtained.

Example 3

Ascorbic acid (Vc) and the polyolefin coating material (DIC AC-301 of Dainippon Ink) were mixed at a rate of 25% of ascorbic acid. The thin coat of the above-mentioned blend was formed in one side of the aluminum foil web with a thickness of 8 micro, the layer (layer-thickness an average of 0.9 gm$^2$) of ascorbic acid was obtained, and rolled round to a reel shape. The one side surface of the aluminum foil contacted the surface of another side. In the condition, by 30 degrees C., the laminate of a reel shape was aged for five days, and was kept. Subsequently, a laminate was pulled out from the kept reel.

In the laminator, the low-density polyethylene which melted was extruded from the heated T die to the aluminum foil (Al) surface of the laminate of a web shape. The non-printed rear face of the raw paper from the roll of the printed raw paper (paper) and the aluminum foil surface were laminated by the extrusion lamination. In this laminator, the low density polyethylene which melted also to the raw-paper printing surface was extruded simultaneously, and the waterproofing outermost thermoplastic resin layer was formed. By the extrusion of the molten low density polyethylene to the inside of the aluminum foil, the innermost thermoplastic resin layer (innermost LDPE) was formed. The laminations of the obtained packaging laminating material are outermost LDPE/paper/LDPE/aluminum/Vc/innermost LDPE.

About the obtained packaging laminating material, like an example 1, it was evaluated and a good result was obtained similarly.

Example 4

The L-ascorbic-acid sodium of the food-to-be-heated quality maintenance agent is mixed under the ordinary temperature of 25 degrees C. in 10 weight portions to the solid-content 100 weight portion of an anchor-coat agent to the titanate anchor-coat agent (Nihon Soda: T-130). The food-to-be-heated quality-maintenance-agent containing anchor-coat agent is applied to the innermost surface of the laminating packaging material obtained in the Example 1, the innermost film of LDPE is laminated further, and packaging laminating material is obtained.

About the obtained packaging laminating material, the adhesive strength between laminating is measured by the JIS K6854 method (50 mm/min.: Tensile speed). The adhesive strength of the result shows sufficient adhesive strength practically. Moreover, even if the period of storage is extended to 30 days more, strength does not fall.

The obtained packaging material shows the oxygen permeability of less than 5 cc/m$^2$ 24 hr-atm (23-degree-C. 50% RH). The packaging material with crease lines is folded up along with crease lines, and a brick shape (parallelepiped) container is formed.

In cases where liquid food is green tea, the increase in the oxygen concentration of the liquid after preservation for three weeks and two months under the conditions of 60–75 degrees C. and 60% RH is not observed. Moreover, there is no generating of foreign matters, such as mold, and the deterioration of a flavor, flavor, and a scent and other something unusual are not seen.

Example 5

The laminated materials for packaging are produced like Example 3 except using the blend with linear low density polyethylene (mLLDPE) with the narrow molecular weight distribution which polymerized with the metallocene catalyst, and the low density polyethylene by the high-pressure method and, an innermost film with the average density of 0.910, the peak melting point of 97-degree C., the melt flow index of 15, the swelling ratio of 1.5, and a thickness of 25-micrometer layer.

About the obtained packaging laminating material, the adhesive strength of the face of the aluminum foil and other surface to be laminated is measured by the JISK6854 method (tensile speed; 50 mm/min). The adhesive strength of the result shows sufficient adhesive strength practically.

The obtained packaging material shows the oxygen permeability of less than 5 cc/m$^2$ 24 hr-atm (23 degree-C 50% RH). The brick shape container is formed from the packaging material. In cases where liquid food is green tea, the increase in the oxygen concentration of the liquid after preservation for three weeks and two months under the conditions of 60–75 degrees C. and 60% RH is not observed. Moreover, there is no generating of foreign matters, such as mold, and the deterioration of a flavor, flavor, and a scent and other something unusual are not seen.

Furthermore, even if changed into a hot content (about 50–80 degrees C.) from a cold filling content (about 4–6 degrees C.), sufficient seal strength can be obtained.

With the actual proof from the above-mentioned example, the following advantages are obtained by the method of manufacturing of the laminate for packaging of the invention. A good laminate can be obtained to packaging which does not have the delamination between the layers of a laminate. The packaging laminating material which has the good adhesion strength between the layer about the packaging laminating material for the liquid food (for example, a coffee drink, oolong tea, etc.) by which heating storage is carried out within an automatic vending machine or a hot chamber for several weeks to several months can be provided.

Moreover, in the laminating package material manufacture for packaging, the reel for laminating can be kept with laminating possibility at a long period of time, and a converting can be carried out effectively and efficiently easily.

In the embodiment of addition of the quality maintenance material for food to be heated, since the quality maintenance material for food to be heated is contained inside laminating material, the quality maintenance material for food to be heated does not contact the content liquid food. Therefore, there is no problem of bleeding of the quality maintenance material for food to be heated, and liquid packaging can be used safely.

In the embodiment which uses metallocene polyethylene for an innermost layer, since a molecular weight distribution is narrow, therefore there are little low-molecular-weight components, a flavor, tasty, and a scent are maintainable with prevention of bleeding. Tougher seal strength is made possible, influence is not received in the temperature of a filling content, but a good seal is obtained.

In the embodiment which the minute phyllosilicate is dispersing uniformly substantially, since the dispersed layer has a gas barrier, the laminating packaging object which has a good non-scalping to perfume or tasty can be acquired.

INDUSTRIAL AVAILABILITY

From the laminate obtained by this invention, liquid food products, such as cow's milk, a lactic-acid-bacteria drink, liquid soup, a fruit-juice drink, barley tea, green tea, oolong tea, liquor, and a seasoning, are applicable to filling packaging. Preferably, a paper container, (such as a one piece type, a two piece type, and a three-piece type containers), a composite can, an insert molding container, a double container, etc. can be formed for the above-mentioned liquid food grade.

What is claimed is:

1. A method of manufacturing a web-shaped packaging laminate which comprises an innermost polyolefin layer, a barrier layer of an aluminum foil or an inorganic-oxide vapor deposition film, a polyolefin lamination layer, and a fibrous carrier layer, the method comprising:

adhering or attaching a deoxidant of vitamin E, ascorbic acid or its derivative on an inner surface of the barrier layer which is web-shaped to produce a deoxidant-adhered/attached-barrier layer having a deoxidant-adhered/attached-inner surface, rolling round the deoxidant-adhered/attached-barrier-layer temporarily to a reel shape to directly contact the deoxidant-adhered/attached-inner surface and an external surface of the barrier layer for a predetermined time, pulling out the deoxidant-adhered/attached-barrier-layer from the reel shape, and laminating the barrier layer and the fibrous carrier layer by extrusion lamination of the polyolefin lamination layer between the external surface of the barrier layer and an inside of the fibrous carrier layer, and laminating the innermost polyolefin layer by extrusion lamination to an inside of the deoxidant-adhered/attached-barrier-layer simultaneously, before or after laminating the barrier layer and the fibrous carrier layer.

2. A method of manufacturing a web-shaped packaging laminate according to claim 1, wherein the adhering or attaching of the deoxidant to the inner surface of the barrier layer includes coating the inner surface of the barrier layer with coating material in which the deoxidant is blended.

3. A method of manufacturing a web-shaped packaging laminate according to claim 1, wherein the innermost polyolefin layer contains at least linear low density polyethylene having a narrow molecular weight distribution, an average density of 0.900–0.915, a peak melting point of 88–103 degree C., a melt flow index of 5–20, a swelling ratio (SR) of 1.4–1.6, and a layer thickness of 20-50 micrometer.

4. A method of manufacturing a web-shaped packaging laminate according to claim 1, wherein the laminate contains a quality maintenance agent for food to be heated.

5. A method of manufacturing a web-shaped packaging laminate according to claim 1, wherein the laminate contains substantially uniformly dispersed minute phyllosilicate and a quality maintenance agent for food to be heated.

6. A method of manufacturing a web-shaped packaging laminate according to claim 1, wherein the deoxidant-adhered/attached-barrier-layer is kept in the reel shape at a temperature of 15 degrees C. –40 degrees C., with the predetermined time being at least 48 hours.

7. A method of manufacturing a packaging laminate for use in producing a container to be packaged with hot liquid food, comprising:

applying a deoxidant of vitamin E, ascorbic acid or its derivative to a first surface of a web-shaped barrier layer so that the barrier layer possesses a deoxidant-applied surface, the barrier layer also having a second surface located opposite the deoxidant-applied surface, the barrier layer being comprised of aluminum foil or an inorganic-oxide vapor deposition film;

reeling the barrier layer into a reel shape to contact the second surface of the barrier layer with the deoxidant-applied surface of the barrier layer;

unreeling the barrier-layer from the reel shape;

laminating a fibrous carrier layer to the barrier layer by extrusion laminating a polyolefin layer between the second surface of the barrier layer and the fibrous carrier layer; and extrusion laminating an innermost polyolefin layer to the barrier layer so that the deoxidant applied to the barrier layer is located between the barrier layer and the innermost polyolefin layer.

8. A method of manufacturing a packaging laminate according to claim 7, wherein the deoxidant is applied to the first surface of the web-shaped barrier layer by coating the first surface of the barrier layer with coating material in which the deoxidant is blended.

9. A method of manufacturing a packaging laminate according to claim 7, wherein the innermost polyolefin layer contains linear low density polyethylene having an average density of 0.900–0.915, a peak melting point of 88–103-degree C., a melt flow index of 520, a swelling ratio (SR) of 1.4–1.6, and a thickness of 20–50-micrometer.

10. A method of manufacturing a packaging laminate according to claim 7, wherein the laminate contains ascorbic acid, ascorbate or vitamin E as a quality maintenance agent for food to be heated.

11. A method of manufacturing a packaging laminate according to claim 10, wherein the quality maintenance agent for food to be heated is contained in an adhesive or an anchor-coat agent.

12. A method of manufacturing a packaging laminate according to claim 7, wherein the laminate contains phyllosilicate.

13. A method of manufacturing a packaging laminate according to claim 7, wherein the barrier layer with the applied deoxidant is kept in the reel shape at a temperature of 15 degrees C. –40 degrees.

14. A method of manufacturing a packaging laminate according to claim 7, wherein the barrier layer with the applied deoxidant is kept in the reel shape for a predetermined period of time.

15. A method of manufacturing a packaging laminate according to claim 7, wherein the barrier layer with the applied deoxidant is kept in the reel shape for at least 48 hours.

16. A method of manufacturing a packaging laminate according to claim 7, wherein the innermost polyolefin layer is extrusion laminated to the barrier layer before, during or after the fibrous carrier layer is laminated to the barrier layer.

17. A method of manufacturing a packaging laminate for use in producing a container to be packaged with hot liquid food, comprising:

unreeling a web-shaped barrier layer which has been maintained for a predetermined period of time in a reel shape in which a deoxidant of vitamin E, ascorbic acid or its derivative on an inner surface of the barrier layer is in contact with an outer surface of the barrier layer, the barrier layer being an aluminum foil or an inorganic-oxide vapor deposition film;

applying a polyolefin layer between the outer surface of the barrier layer and a fibrous carrier layer to laminate the fibrous carrier layer to the barrier layer; and extrusion laminating an innermost polyolefin layer to the barrier layer so that the deoxidant applied to the barrier layer is located between the barrier layer and the innermost polyolefin layer.

18. A method of manufacturing a packaging laminate according to claim 17, wherein the predetermined period of time in which the barrier layer has been maintained in the reel shape is at least 48 hours, and the barrier layer has been maintained in the reel shape at a temperature of 15 degrees C. –40 degrees.

19. A method of manufacturing a packaging laminate according to claim 17, wherein the innermost polyolefin layer is extrusion laminated to the barrier layer before, during or after the fibrous carrier layer is laminated to the barrier layer.

20. A method of manufacturing a packaging laminate according to claim 17, wherein the innermost polyolefin layer contains linear low density polyethylene having an average density of 0.900–00915, a peak melting point of 88–103-degree C., a melt flow index of 5–20, a swelling ratio (SR) of 1.4–1.6, and a thickness of 20-50-micrometer.

* * * * *